United States Patent
Beer et al.

(10) Patent No.: US 7,444,898 B2
(45) Date of Patent: Nov. 4, 2008

(54) SHIFTING DEVICE HAVING SHIFT RECOGNITION FEATURE

(75) Inventors: Uwe Beer, Fahrland (DE); Michael Drabek, Schenkenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 636 days.

(21) Appl. No.: 10/517,994

(22) PCT Filed: Jun. 21, 2003

(86) PCT No.: PCT/EP03/06562

§ 371 (c)(1),
(2), (4) Date: Dec. 15, 2004

(87) PCT Pub. No.: WO2004/003406

PCT Pub. Date: Jan. 8, 2004

(65) Prior Publication Data

US 2006/0060020 A1    Mar. 23, 2006

(30) Foreign Application Priority Data

Jun. 29, 2002   (DE) ............................... 102 29 320

(51) Int. Cl.
*F16H 61/24* (2006.01)
(52) U.S. Cl. .................... 74/473.21; 74/473.26
(58) Field of Classification Search ........... 74/73.21, 74/473.27, 473.28, 473.36, 473.37, 527, 74/530, 532, 27, 28, 36, 37, 1, 22, 569, 567, 74/575, 577 M, 473.26
See application file for complete search history.

(56) References Cited

U.S. PATENT DOCUMENTS 5,140,866 A    8/1992   Schetter et al.
5,845,538 A *  12/1998  Tornatore ................ 74/473.36

FOREIGN PATENT DOCUMENTS

| DE | 196 53 171 A  | * 6/1998 |
| DE | 196 53 171 A1 |   6/1998 |
| DE | 100 16 364 A  | * 10/2001 |
| DE | 100 16 364 A1 |  10/2001 |
| EP | 0 479 876 B1  |  10/1994 |
| WO | WO-91/00448   |   1/1991 |

* cited by examiner

*Primary Examiner*—Richard W Ridley
*Assistant Examiner*—Doron D. Fields
(74) *Attorney, Agent, or Firm*—Davis Bujold & Daniels, P.L.L.C.

(57) ABSTRACT

In a shifting assembly for a multiple-gear variable speed motor vehicle transmission, a central selector or shifting shaft (2) is mounted in the transmission housing (12) such that it can be rotated and displaced axially. By rotating the selector or shifting shaft (2) a coupling to be actuated in a shift gate can be selected, and by subsequently axially displacing the shaft, the gears can be engaged. At least two roller arms (4), spaced somewhat from one another, are positioned on the selector or shifting shaft (2), bearing a rod (6) between them. The rod (6) is mechanically linked with a contoured element or lever (16) that is mounted in the transmission housing (12) such that it can swivel. The contoured edge (20) of the contoured element or lever (16) mirrors the selection patterns and is spring loaded against the rod (6) by a spring element (18).

5 Claims, 2 Drawing Sheets

SHIFTING DEVICE HAVING SHIFT RECOGNITION FEATURE

This application is a national stage completion of PCT/EP2003/006562 filed Jun. 21, 2003 which claims priority from German Application Serial No. 102 29 320.1 filed Jun. 29, 2002.

FIELD OF THE INVENTION

The invention relates to a shifting assembly.

BACKGROUND OF THE INVENTION

In shifting assemblies for variable speed transmissions comprising a central shifting shaft, various components of the transmission are used to generate selection and shifting forces. The components serve, especially to support the driver of the vehicle, in guiding the shifting lever into the shift gates according to the gearshift pattern, while preventing damage to the components of the transmission with the support. The driver of the vehicle needs to develop a feeling for which shift gate the shifting lever is in. In this, special attention should be paid to the transition to those shift gates in which particularly small gear ratio reductions or step-ups are made or in which the reverse gear is engaged. If too small a gear ratio reduction or step-up were made or if reverse gear were engaged without the vehicle conditions allowing this, specifically if the speed of the vehicle was too great at the time the reverse in the direction of travel was made when the vehicle was not at rest, then the shifting assembly, especially its synchronized mechanisms, would suffer damage.

From EP 0 479 876 B1, a selector rocker designed as a lever at the hub of which the selector or shifting shaft is realized via roller bodies that engage in axially extending guide grooves of the hub such that the components have a non-rotatable and axially displaceable design, can be swivelled from its neutral position to a selected position against the force of at least one spring element that is affixed to the housing. The mounting of the selector rocker that is designed as a lever on the selector or shifting shaft is a very costly design. Reductions in the diameter dimensions of the selector or shifting shaft must be made in order to accommodate the roller bodies, which can result in an impairment of the stability of the assembly.

The object of the invention is to disclose a shifting assembly that will eliminate the disadvantages of the state of the art.

SUMMARY OF THE INVENTION

In a shifting assembly for a multiple-gear variable speed motor vehicle transmission having a central selector or shifting shaft, which is mounted in the transmission housing such that it can be rotated and displaced axially, the rotation of the selector or shifting shaft causes the selection of a sliding sleeve to be actuated in a shift gate, and the subsequent axial displacement causes the gear to be shifted. To form the selection patterns, a device is provided on the selector or shifting shaft or on an auxiliary shaft controlled by the selector or shifting shaft, wherein the device bears a rod. The rod acts in conjunction with a contoured element, for example a lever, which is mounted in the transmission housing such that it can swivel. The outline of the contoured element mirrors the contours of the selection patterns and is spring-loaded via a spring element against the rod. When the selector or shifting shaft is turned, which corresponds to a selection process, the rod slides along the outline of the contoured element. Depending upon the design of the contoured outline and thus dependent upon the desired selection pattern, a greater or lesser amount of force must be applied during the rotation of the selector or shifting shaft, in which process the contoured element is pressed against the spring element. In this manner, the selection force can be transferred very directly to the contour By adjusting the shape of the contour, any selection pattern can be created. The selection torque is transferred to the contoured element independently of the axial position of the selector or shifting shaft or of an auxiliary shaft that is controlled by the selector or shifting shaft. As a result, in one advantageous embodiment, the device is positioned on the selector or shifting shaft, or on an auxiliary shaft that is controlled by the selector or shifting shaft, such that said device can be displaced axially, while the rod is not displaced axially relative to the contoured element.

In another advantageous embodiment, a rotatable cylinder is provided on the rod such that it can be displaced axially on the rod and operates in conjunction with the contoured edge of the contoured element, while the device itself is axially stationary on the selector or shifting shaft or on an auxiliary shaft that is controlled by the selector or shifting shaft. In this manner, a very low level of friction between the rod and the contoured edge is ensured. The cylinder rolls along the contoured edge and can simultaneously be displaced axially on the rod or the rod can be displaced axially within the cylinder. This type of design is particularly advantageous if the cylinder is equipped along its circumference with a groove in which the edge of the contoured element engages, so that the cylinder is held axially by the edge of the contoured element. In this manner, slight frictional forces are produced with the simultaneous selection and shifting as a result of the use of latching elements that can be moved in any direction. The cost of the shifting assembly and the structural space it requires are particularly favorable, and only a small number of components are required.

A further advantageous embodiment shows the contoured edge with its deepest notch being in a neutral position that corresponds to a non-actuated position of rest for a shifting lever in a selection gate. The shifting lever in the shifting pattern is not actuated and, when no gear is engaged, is in a position in the selection gate that ordinarily corresponds to the position of the shifting track for the third/fourth gear. This gate locking function of the selector or shifting shaft is a result of the spring force of the spring element acting against the contoured edge.

Effects from the spring element that could impair selection and shifting comfort are not transferred by the contoured element to the selector or shifting shaft.

BRIEF DESCRIPTION OF THE DRAWINGS

The invention will now be described, by way of example, with reference to the accompanying drawings in which.

DETAILED DESCRIPTION OF THE INVENTION

Figure 1:
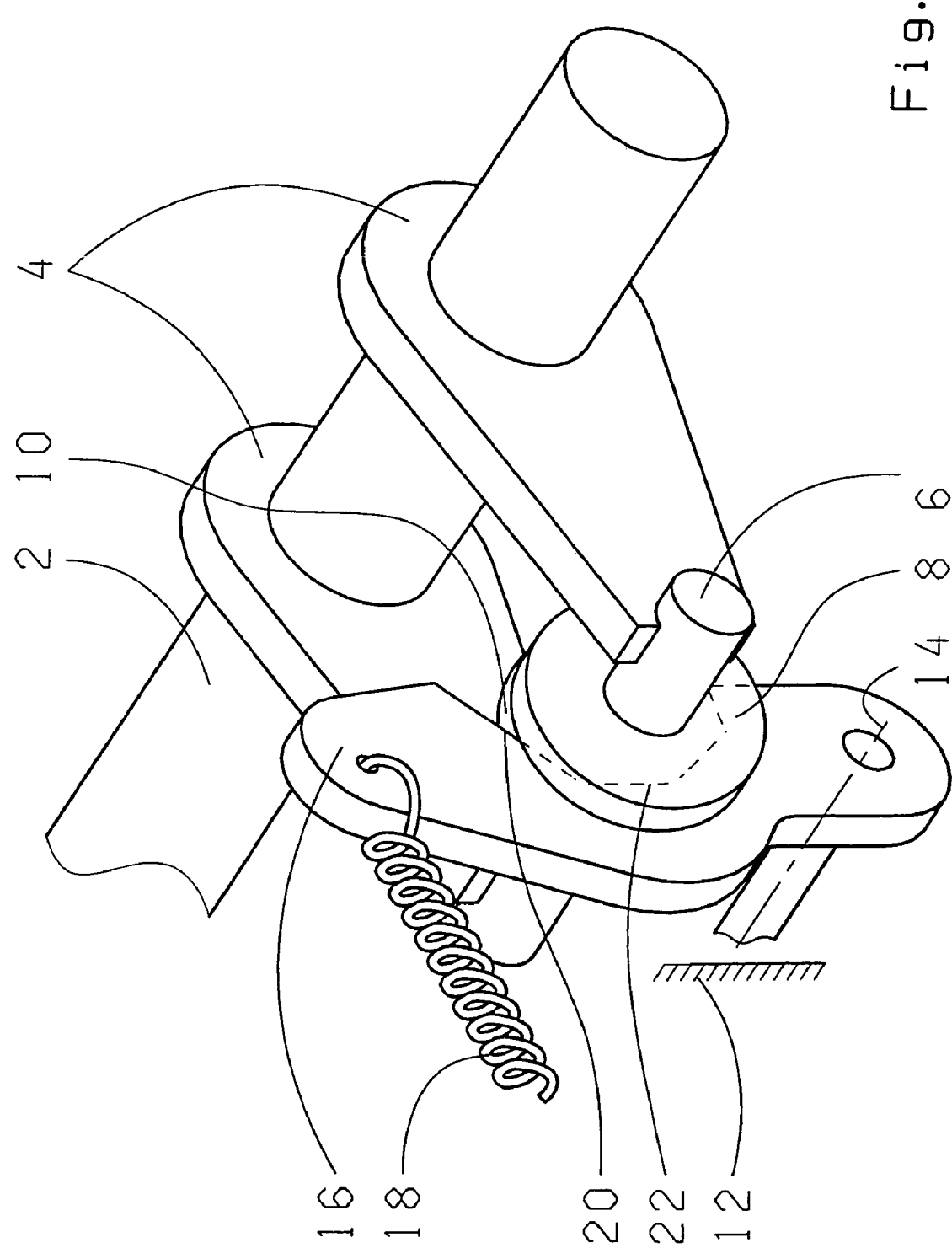
FIG. 1 a selector or shifting shaft with the device attached.

FIG. 1 shows a selector or shifting shaft 2, on which two roller arms 4 are positioned, spaced somewhat from one another, in a device such that they are arranged non-rotatably and axially non-displaceably. The two roller arms 4 together hold a rod 6, which is firmly affixed to the two roller arms 4. A cylinder 8 is mounted on the rod 6 such that it can be rotated and displaced axially. The cylinder 8 is provided around its circumference with a groove 10. A lever 16 that is capable of swiveling around an axis 14 is mounted in a transmission housing 12. The lever 16 is supported by a spring element 18 against the transmission housing 12. In a central area, the lever 16 is equipped with a contoured edge 20 that is designed to correspond to the desired selection pattern. A deep notch 22 of the contoured edge 20 corresponds to the neutral position of a shifting lever (not shown here), which is connected to the selector or shifting shaft 2. The contoured edge 20 of the lever 16 engages in the groove 10 of the cylinder 8, causing the cylinder 8 to become fixed in its axial position on the rod 6. When the selector and shifting shaft 2 is turned, the cylinder 8 rolls along the contoured edge 20 of the lever 16, while the cylinder 8 rotates about the rod 6. Depending upon the design of the contoured edge 20, the rotation places more or less stress on the spring element 18, i.e. the driver of the vehicle senses during the rotation of the selector or shifting shaft 2, via the shifting lever 16, a greater or lesser amount of counterforce, and can develop a feeling for which shift gate he has placed the shifting lever 16 in with his selection. Furthermore, if the selector or shifting shaft 2 is displaced axially, the rod 6 is displaced inside the cylinder 8 and the cylinder 8 is guided radially and axially along the contoured edge 20 of the lever 16, without generating a significant amount of friction.

Figure 2:
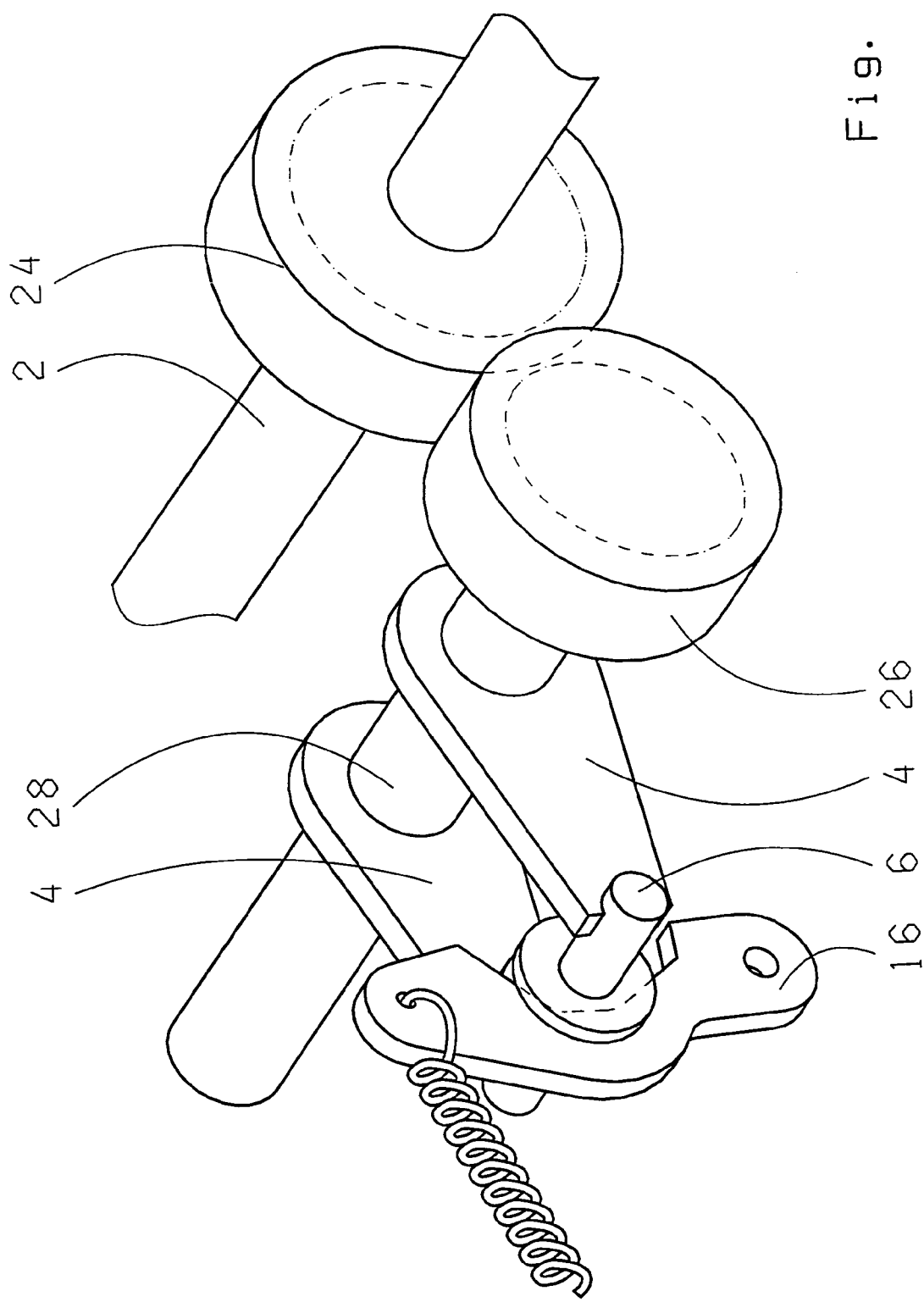
FIG. 2 an auxiliary shaft controlled by a selector or shifting shaft, with the device attached.

FIG. 2 shows a selector or shifting shaft 2 on which a toothed gear 24 is arranged such that it cannot rotate. A toothed gear 26 on an auxiliary shaft 28 meshes with the toothed gear 24, so that when the selector or shifting shaft 2 is turned, the auxiliary shaft 28 is also turned. The teeth on the gears 24 and 26 overlap one another far enough that the teeth remain meshed even when they are displaced axially. Otherwise, the arrangement of the roller arms 4, the rod 6, and the lever 16 correspond to those of FIG. 1.

REFERENCE NUMERALS 2 selector or shifting shaft
4 roller arm
6 rod
8 cylinder
10 groove
12 transmission housing
14 axis
16 contoured element or lever
18 spring element
20 contoured edge
22 notch
24 toothed gear
26 toothed gear
28 auxiliary shaft

The invention claimed is:

1. A shifting assembly for a multiple gear variable speed motor vehicle transmission having:
one of a central selector or a shifting shaft (2) being mounted in a transmission housing (12) such that the central selector or the shifting shaft (2) is axially rotated and displaced, and by rotating the selector or the shifting shaft (2), a coupling to be actuated, in a shift gate can be selected, and by subsequently axially displacing the selector or the shifting shaft (2), desired pear ratios are selected, and
at least one arm (4) being provided on one of the selector or the shifting shaft (2) or on an auxiliary shaft (28) that is controlled by the selector or the shifting shaft (2), the at least one arm (4) supporting a rod (6) which is mechanically linked with a lever (16) mounted in the transmission housing (12) such that the lever (16) can swivel;
a contoured edge (20) of the lever (16) mirrors selection patterns and is spring loaded against the rod (6) by a spring element (18);
a rotatable cylinder (8)being provided on the rod (6);
the spring (18) biases the lever (16) toward both the cylinder (8) and the central selector or the shifting shaft (2);
the rotatable cylinder (8) operates in conjunction with the contoured edge (20) of the lever (16);
the cylinder (8) is capable of being displaced axially on the rod (6), and
a circumference of the cylinder (8) has an annular groove (10) which rolls along the contoured edge (20) of the lever (16).

2. A shifting assembly for a multi-gear transmission, the shift assembly comprising:
a rotatable and axially slidable shifting shaft (2) which is at least one of rotated and axially biased to shift from one gear of the multi-gear transmission to another gear of the multi-gear transmission;
at least one arm (4) having a first end supported by the shifting shaft (2) and a remote second end engaging with a rod (6);
the rod (6) supporting a cylinder (8) having a groove (10) formed therein;
a single lever (16) being pivotably supported about a fixed pivot axis (14), the single lever (16) having a contoured edge (20) which the groove (10) of the cylinder (8) engages to facilitate rolling of the cylinder (8) along the contoured edge (20) during a shifting operation; and
a spring (18) biases the contoured edge (20) of the lever (16) toward both the cylinder (8) and the shifting shaft (2) such that the contoured edge (20) engages with the cylinder (8) and, as the shifting shaft (2) rotates, the groove (10) of the cylinder (8) rolls along the contoured edge (20) so that a variation in forces are applied to the shifting shaft (2) which are sensed by a driver operating the shifting assembly.

3. The shifting assembly according to claim 2, wherein a deepest notch (22) of the contoured edge (20) corresponds to a neutral non-actuated position for the shifting lever.

4. A shifting assembly for a multi-gear transmission, the shift assembly comprising:
a rotatable and axially slidable shifting shaft (2) which is at least one of rotated and axially biased to shift from one gear of the multi-gear transmission to another gear of the multi-gear transmission;
a pair of spaced apart arms (4) each having a first end supported by the shifting shaft (2) and a remote second end supporting a rod (6);
the rod (6) supporting a cylinder (8) between the pair of spaced apart arms (4) and the cylinder (8) having a groove (10) formed therein;
a single lever (16) being pivotably supported about a fixed pivot axis (14), the single lever (16) having a contoured edge (20) which faces the shifting shaft (2) and mating engages with the groove (10) of the cylinder (8) to facilitate rolling of the cylinder (8) along the contoured edge (20) during a shifting operation; and
a spring (18) biases the contoured edge (20) of the lever (16) toward both the cylinder (8) and the shifting shaft (2) such that the contoured edge (20) engages with the cylinder(8) and, as the shifting shaft (2) rotates, the groove (10) of the cylinder (8) rolls along the contoured edge (20) so that a variation in forces are applied to the shifting shaft (2) which am sensed by a driver operating the shifting assembly.

5. The shifting assembly according to claim 4, wherein a deepest notch (22) of the contoured edge (20) corresponds to a neutral non-actuated position for the shifting lever.

* * * * *